(12) United States Patent
Strauss (10) Patent No.: US 6,467,472 B1
(45) Date of Patent: Oct. 22, 2002

(54) SYSTEM AND METHOD FOR IMPROVED SENSING OF EXHAUST PRESSURE

(75) Inventor: Sebastian Strauss, Park City, IL (US)

(73) Assignee: Bombardier Motor Corporation of America, Grant, FL (US)

(*) Notice: Subject to any disclaimer, the term of this patent is extended or adjusted under 35 U.S.C. 154(b) by 0 days.

(21) Appl. No.: 09/723,496

(22) Filed: Nov. 28, 2000

(51) Int. Cl.⁷ ............................................. F02D 41/14
(52) U.S. Cl. ..................................... 123/676; 73/117.3
(58) Field of Search ............................ 123/676, 73 C; 73/117.3, 31.04

(56) References Cited

U.S. PATENT DOCUMENTS

| | | | |
|---|---|---|---|
| 4,930,482 A | * 6/1990 | Kako | 123/488 |
| 5,193,513 A | * 3/1993 | Marko et al. | 123/676 |
| 5,215,068 A | * 6/1993 | Kato | 123/676 |
| 5,241,940 A | * 9/1993 | Gates, Jr. | 123/568 |
| 5,622,158 A | 4/1997 | Katoh et al. | 123/676 |
| 5,630,395 A | 5/1997 | Katoh et al. | 123/406 |
| 5,682,867 A | * 11/1997 | Katoh et al. | 123/676 |
| 5,941,743 A | 8/1999 | Kato | 440/1 |
| 6,019,094 A | * 2/2000 | Itoyama | 123/676 |
| 6,283,107 B1 | * 9/2001 | Koerner | 123/676 |

* cited by examiner

Primary Examiner—Erick Solis
(74) Attorney, Agent, or Firm—Fletcher, Yoder & Van Someren (57) ABSTRACT

An exhaust pressure sensing system and method for an internal combustion engine. The system includes a pressure sensor positioned to sense exhaust pressure of an internal combustion engine. An attenuator reduces the relatively large pressure fluctuations that would otherwise impinge on the pressure sensor to provide an averaging of the exhaust backpressure to which the pressure sensor is exposed.

41 Claims, 5 Drawing Sheets

SYSTEM AND METHOD FOR IMPROVED SENSING OF EXHAUST PRESSURE

FIELD OF THE INVENTION

The present invention relates generally to a system and method for sensing and controlling characteristics of certain internal combustion engines, and particularly to a system and method for improving the sensing of exhaust backpressure for an engine.

BACKGROUND OF THE INVENTION

Internal combustion engines are used in a wide variety of applications, including the providing the power for a variety of vehicles. Generally, such engines include one or more cylinders that each contain a piston designed for movement in a reciprocating manner. Each piston is connected to a crankshaft by a connecting rod that delivers force from the piston to the crankshaft in a manner that rotates the crankshaft. Power to drive the piston is provided by igniting an air-fuel mixture supplied to the cylinder on a side of the piston opposite the connecting rod. The air-fuel mixture is ignited, e.g. by an ignition device, such as a spark plug having electrodes across which a spark is provided.

Air and fuel may be supplied to each cylinder by a variety of mechanisms, such as carburetor or fuel injection systems. Adjusting or changing the air-fuel mixture according to operating conditions permits greater optimization of desired engine operation characteristics. For example, application of greater throttle for increased engine speed requires a greater quantity of fuel. On the other hand, maintaining the engine operation at a lower RPM, requires a lesser quantity of fuel supplied to each cylinder. Generally, greater control over combustion conditions, e.g. air-fuel mixture, provides an engine designer with a greater ability to bring about a desired engine performance under a greater range of operating conditions.

Modern engines often utilize electronic fuel injection systems that inject specific amounts of fuel based on a stored fuel map. The fuel map effectively acts as a guide to fuel injection quantities based on a variety of sensed parameters, such as engine speed, throttle position, exhaust pressure and engine temperature. For example, detection of pressure in the exhaust system under given operating conditions can be used to adjust one or more combustion parameters of the engine.

Pressure sensors can be used to detect pressure in an exhaust system and to output a signal representative of the pressure. However, the exhaust pressure is subject to large fluctuations that create a sometimes radically fluctuating output signal. Often, it is desirable to obtain a more useable signal that is representative of the average exhaust backpressure of the engine.

SUMMARY OF THE INVENTION

The present invention features a system and method for measuring the exhaust pressure of an internal combustion engine. The technique utilizes a pressure sensor placed into fluid communication with an exhaust flow path of the internal combustion engine. Additionally, an attenuator is utilized to automatically provide time averaging of the otherwise relatively large exhaust pressure fluctuations.

BRIEF DESCRIPTION OF THE DRAWINGS

The invention will hereafter be described with reference to the accompanying drawings, wherein like reference numerals denote like elements, and.

DETAILED DESCRIPTION OF THE PREFERRED EMBODIMENTS

For the sake of clarity in explanation, the present technique is described in conjunction with engines that operate on a two-stroke cycle and utilize fuel injection. The present system and method are particularly amenable for use in two-stroke engines that inject fuel, such as gasoline, directly into each cylinder of the engine. The exemplary embodiment described herein should not be construed as limiting, however, and has potential uses in other types of two-stroke and four-stroke engine applications that may benefit from a control system that uniquely utilizes the sensing of combustion end products, e.g. exhaust gasses, to adjust the air-fuel mixture introduced into one or more of the engine cylinders.

Figures 1, 2:
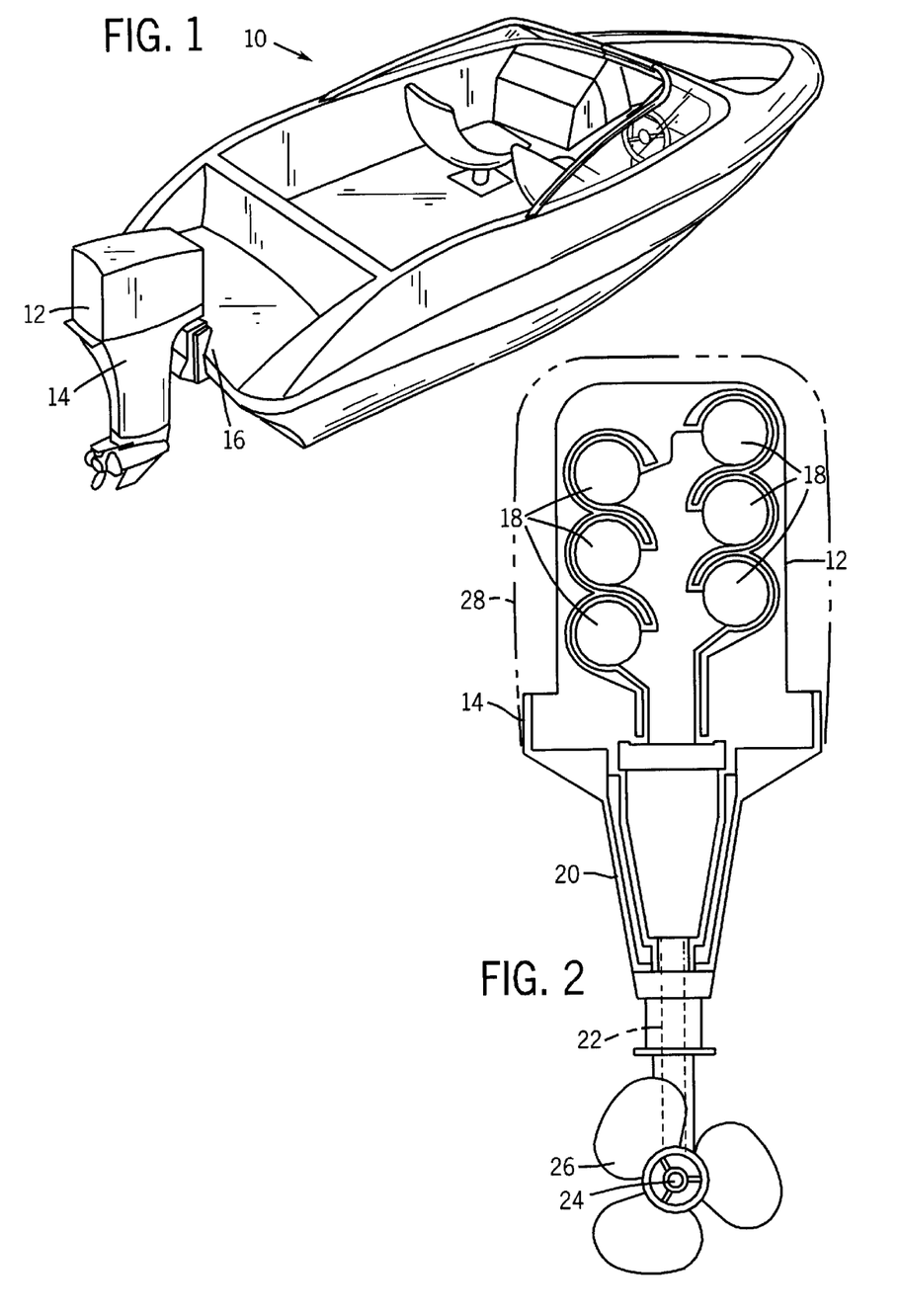
FIG. 1 is a perspective view of a watercraft powered by an exemplary internal combustion engine utilizing an exhaust pressure sensing system, according to an embodiment of the present technique.
FIG. 2 is a schematic representation of the outboard motor that is illustrated in FIG. 1 and includes an internal combustion engine benefiting from an exhaust pressure sensing system, according to an embodiment of the present technique.

Referring generally to FIG. 1, an exemplary application of the present system is illustrated. In this application, a watercraft 10, such as a boat, is powered by an engine 12 disposed in an outboard motor 14. Watercraft 10 can also be a personal watercraft or boat having an internally mounted engine. In the illustrated embodiment, outboard motor 14 is mounted to a transom 16 of watercraft 10. Engine 12 is a two-stroke engine that utilizes direct fuel injection, as explained more fully below.

Although engine 12 may be a single cylinder engine, it often includes a plurality of cylinders 18, e.g. six cylinders, as illustrated schematically in FIG. 2. In the application described above, engine 12 is mounted to an outboard motor frame 20 that supports engine 12 and encloses a drive shaft 22. Generally, drive shaft 22 is vertical and connects to an output shaft 24 to which a propeller 26 is mounted. Engine 12 rotates drive shaft 22 which, in turn, rotates output shaft 24. Output shaft 24 is connected to propeller 26 by, for example, splines that rotate the propeller to drive watercraft 10 along the surface of the water. A shroud or housing 28 encloses engine 12.

Figure 3:
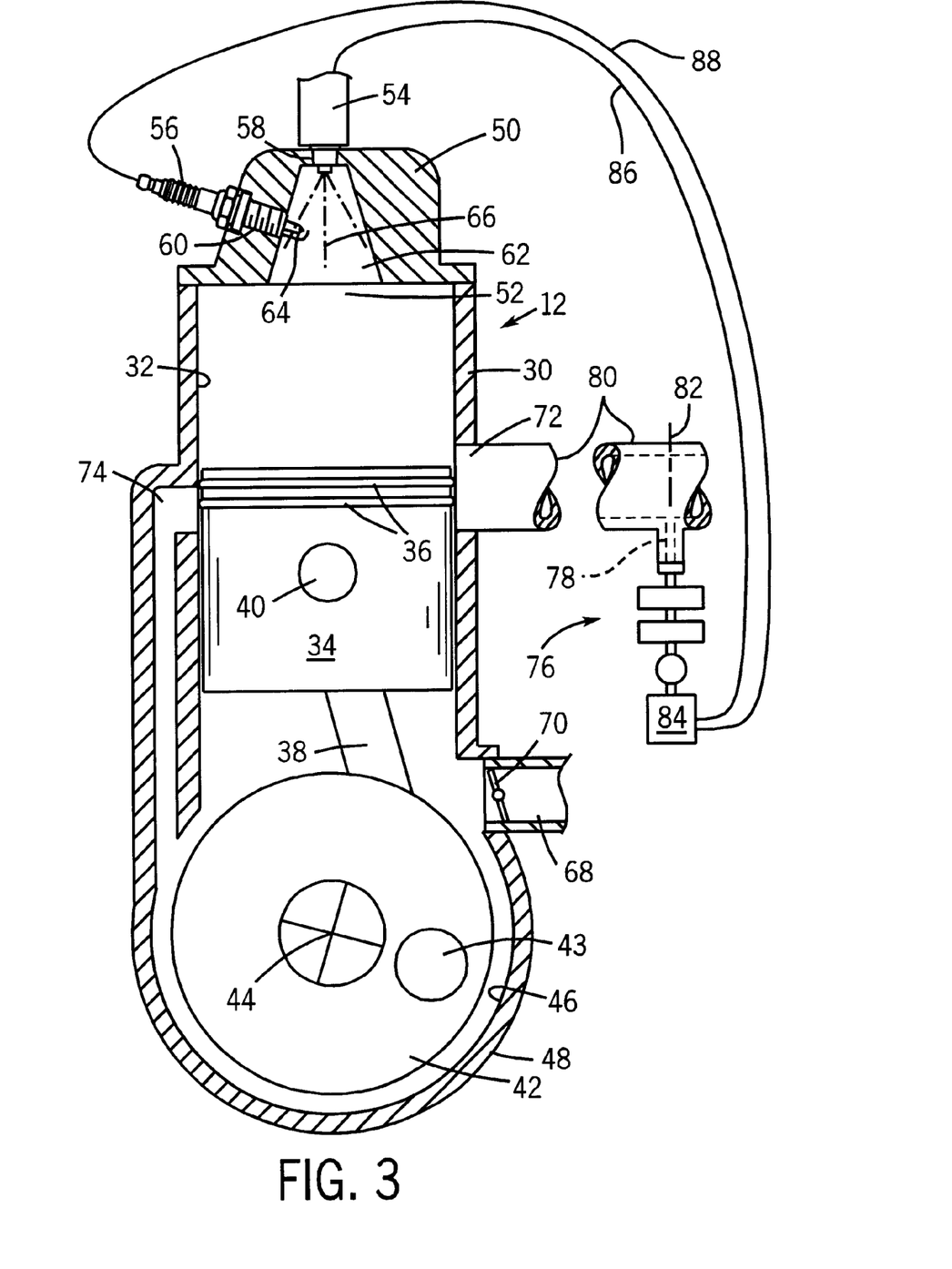
FIG. 3 is a schematic cross-sectional view of a single cylinder in an exemplary two-stroke engine, such as the engine illustrated in FIG. 2.

Referring generally to FIG. 3, a single cylinder of an exemplary two-stroke engine 12 is illustrated. In this embodiment, engine 12 includes a cylinder 30 having an internal cylinder bore 32 through which a piston 34 reciprocates. Piston 34 typically includes one or more rings 36 that promote a better seal between piston 34 and cylinder bore 32 as piston 34 reciprocates within cylinder 30.

Piston 34 is coupled to a connecting rod 38 by a pin 40, sometimes referred to as a wrist pin. Opposite pin 40, connecting rod 38 is connected to a crankshaft 42 at a location 43 offset from a crankshaft central axis 44. Crankshaft 42 rotates about axis 44 in a crankshaft chamber 46 defined by a housing 48.

At an end of cylinder 30 opposite crankshaft housing 48, a cylinder head 50 is mounted to cylinder 30 to define a combustion chamber 52. Cylinder head 50 may be used to mount a fuel injector 54 and a spark plug 56, which are received in a pair of openings 58 and 60, respectively. Openings 58 and 60 may be formed through the wall that forms either cylinder head 50 or cylinder 30. In the illustrated embodiment, openings 58 and 60 are formed through the wall of cylinder head 50 for communication with combustion chamber 52 within a recessed internal region 62 of cylinder head 50.

By way of example, fuel injector 54 may be centrally located at the top of cylinder head 50, as illustrated in FIG. 3. Spark plug 56 preferably is disposed at an angle such that its electrodes 64, and consequently the spark, are positioned in an actual fuel spray pattern 66. Fuel spray pattern 66 is the "cone" or other pattern of fuel spray injected by fuel injector 54.

In operation, piston 34 travels towards cylinder head 50 to compress a charge of air within combustion chamber 52. Simultaneously, fuel injector 54 injects fuel to create an air-fuel mixture that is ignited by an appropriately timed spark across electrodes 64. As piston 34 travels towards cylinder head 50, air is drawn through an inlet port 68 into crankshaft chamber 46 and cylinder 30 on a side of piston 34 opposite combustion chamber 52. A valve 70, such as a reed valve, allows the air to pass into engine 12 but prevents escape back through inlet port 68.

Upon ignition of the air-fuel charge in combustion chamber 52, piston 34 is driven away from cylinder head 50 past an exhaust port 72 through which the exhaust gasses are discharged. As piston 34 moves past exhaust port 72, it ultimately exposes a transfer port 74. Air from crankshaft chamber 46 is forced through port 74 and into cylinder 30 on the combustion chamber side of piston 34. Effectively, the downward travel of piston 34 compresses the air in crankshaft chamber 46 and forces a fresh charge of air into cylinder 30 through transfer port 74 for the next ignition.

This reciprocal motion of piston 34 drives connecting rod 38 and crankshaft 32 to provide power to, for example, drive shaft 22 of outboard motor 14. To provide the desired power to crankshaft 42, it is necessary that ignition of the air-fuel mixture be carefully timed. If the ignition occurs too early, the resultant explosion works against the progress of piston 34 towards cylinder head 50. On the other hand, if ignition is too late, less power is transferred to piston 34.

Additionally, it is beneficial to optimize the air-fuel mixture introduced into a given cylinder to promote a desired result, e.g. power, efficiency of operation, reduced soot, etc. Existing fuel injection systems rely on various sensed parameters, such as throttle position, to adjust the amount of fuel injected. However, as illustrated in FIG. 3, a sensor assembly 76 may be coupled to a sensor port 78 of an exhaust system 80 at a desired location 82 downstream from the exhaust port 72. The sensor assembly 76 may be coupled to a control assembly 84, which is coupled to the two-stroke engine 12. For example, the control assembly 84 may be configured to provide control signals to the fuel injector 54 and the spark plug 56 through control paths 86 and 88, respectively. The control assembly 84 may utilize the sensed parameter from the sensor assembly 76, and adjust one or parameters (e.g., ignition timing or fuel injection angle/ timing) affecting the performance of the engine 12.

Figure 4:
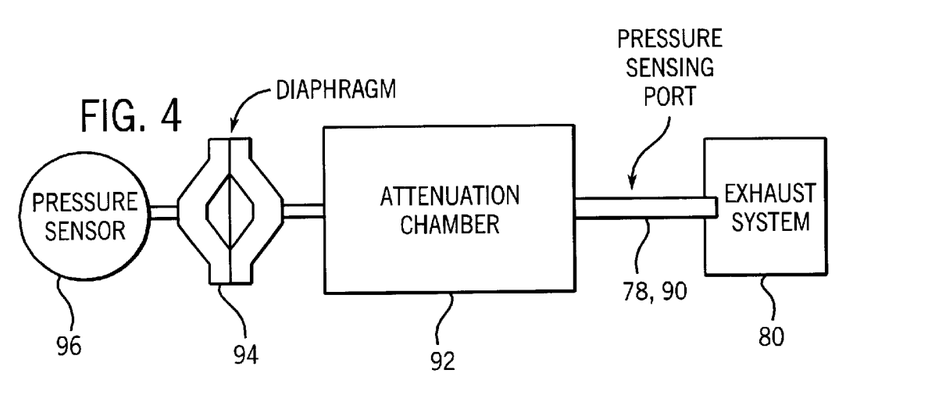
FIG. 4 is a schematic representation of an exhaust pressure sensing system, according to an embodiment of the present technique.

FIG. 4 is a diagram illustrating an exemplary sensor assembly 76 of the present technique. In this exemplary embodiment, the sensor port 78 may be configured as a pressure sensing port 90 for exhaust gases discharging through the exhaust system 80. The sensor assembly 76 may have an attenuation chamber 92 and diaphragm assembly 94 disposed between the pressure sensing port 90 and a pressure sensor 96, as illustrated. Accordingly, pressure variations in the exhaust gases sampled through the pressure sensing port 90 may be significantly attenuated or eliminated (e.g., to produce a mean or average pressure), prior to pressure reading by the pressure sensor 96.

Figure 5:
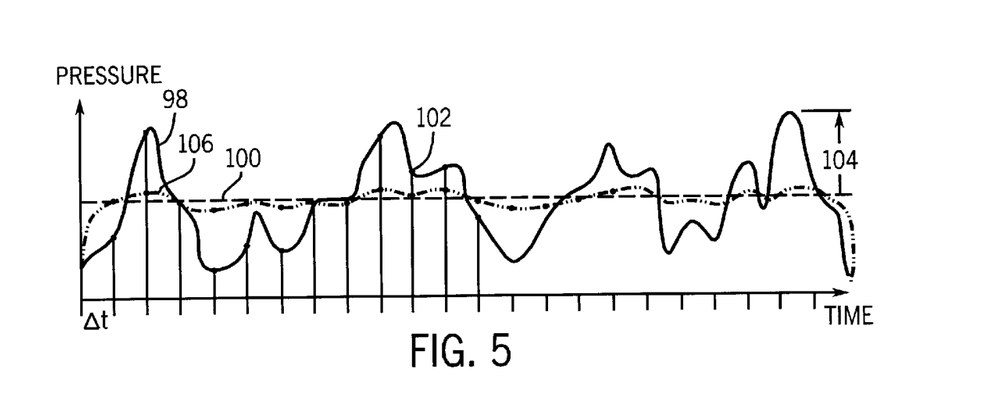
FIG. 5 is a graphical representation of an actual exhaust pressure and an attenuated exhaust pressure versus time.

FIG. 5 is an exemplary plot of pressure versus time comparing an actual exhaust pressure 98 with a reading from the sensor assembly 76 of the present technique. As illustrated, the actual exhaust pressure 98 fluctuates significantly about an average pressure 100. In a conventional pressure sensor assembly, the actual exhaust pressure 98 is measured at sampling points, such as point 102, at time intervals At (e.g., every 20 milliseconds). Accordingly, the pressure fluctuations (e.g., fluctuation 104) read by the conventional pressure sensor assembly require signal filtering and time averaging subsequent to the pressure reading, resulting in a relatively slow response time for the control assembly 84.

The present technique substantially reduces these fluctuations, providing an attenuated pressure 106 relatively close to the average pressure 100, and reads the attenuated pressure 106 to provide a pressure reading to the control assembly 84. The control assembly 84 is then able to use the pressure reading to calculate real-time corrections for various parameters affecting combustion in the engine 12, and to provide adjusted control signals to components such as the fuel injector 54 and the spark plug 56. For example, the real-time corrections may relate to a fuel injection rate and timing for the fuel injector 54, and ignition timing for the spark plug 56.

Figure 6:
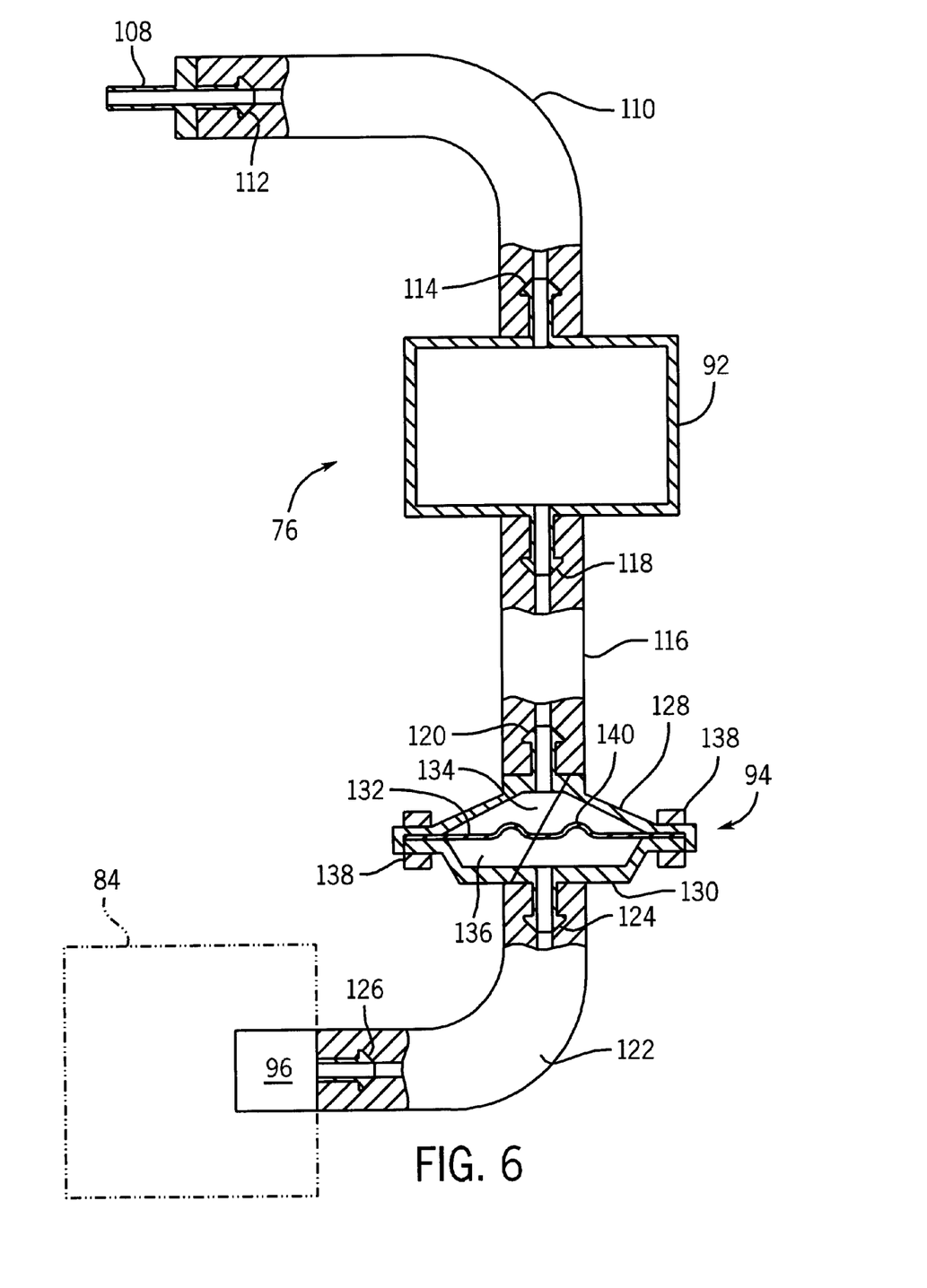
FIG. 6 is a cross-sectional view of an exemplary exhaust pressure sensing system.

FIG. 6 is a cross-sectional view of an exemplary embodiment of the sensor assembly 76. As illustrated, the sensor assembly 76 has a series of hoses or conduits for coupling the various components. The sensor assembly 76 may be coupled to the sensor port 78 by a coupling member 108, which may be fixedly disposed within the sensor port 78. A conduit 110 then couples the coupling member 108 to the attenuation chamber 92. The conduit 110 may be secured to the coupling member 108 and attenuation chamber 92 via flanged ends 112 and 114, respectively. External clamps also may be provided to secure the conduit 110. Similarly, the attenuation chamber 92 is coupled to the diaphragm assembly 94 by a conduit 116, which may be secured by pressure fitting the conduit 116 about flanged ends 118 and 120 of the attenuation chamber 92 and diaphragm assembly 94, respectively. External clamps also may be provided to secure the conduit 116 to the flanged ends 118 and 120.

A conduit 122 is also provided for coupling the diaphragm assembly 94 to the pressure sensor 96, which may be an integral part of the control assembly 84. The conduit 122 is pressurably secured about flanged ends 124 and 126 of the diaphragm assembly 94 and the pressure sensor 96, respectively, and may have external clamps for additional securement of the conduit 122 about the flanged ends 124 and 126.

As illustrated, the attenuation chamber 92 is a rectangular chamber, although a variety of geometries and configurations are contemplated for the present technique. For example, the attenuation chamber 92 may have a conduit extending inwardly from either of the flanged ends 114 and 118. The attenuation chamber 92 also may have a plurality of internal dampening members for dispersing and attenuating pressure fluctuations of incoming exhaust gases.

The diaphragm assembly 94 may have sections 128 and 130 adjacent to the conduits 116 and 122, respectively. As illustrated, a diaphragm member 132 is disposed between the sections 128 and 130 to form opposite cavities 134 and 136, respectively. The sections 128 and 130 may then be fixedly attached (e.g., welded), or removably coupled by securement members 138 (e.g., nut and bolt). Within the diaphragm assembly 94, the diaphragm member 132 advantageously attenuates pressure pulses from the exhaust gases, and may isolate the exhaust gases from the pressure sensor 96. The diaphragm member 132 can comprise a variety of metallic or other suitable materials, depending on the particular application, configuration of the sensor assembly 76, and properties of the exhaust gases (e.g., temperature, pressure, etc.). The diaphragm member 132 also may have a variety of geometries, and may have ribs or other structural features, such as rib 140 (e.g., a circular rib).

Figure 7:
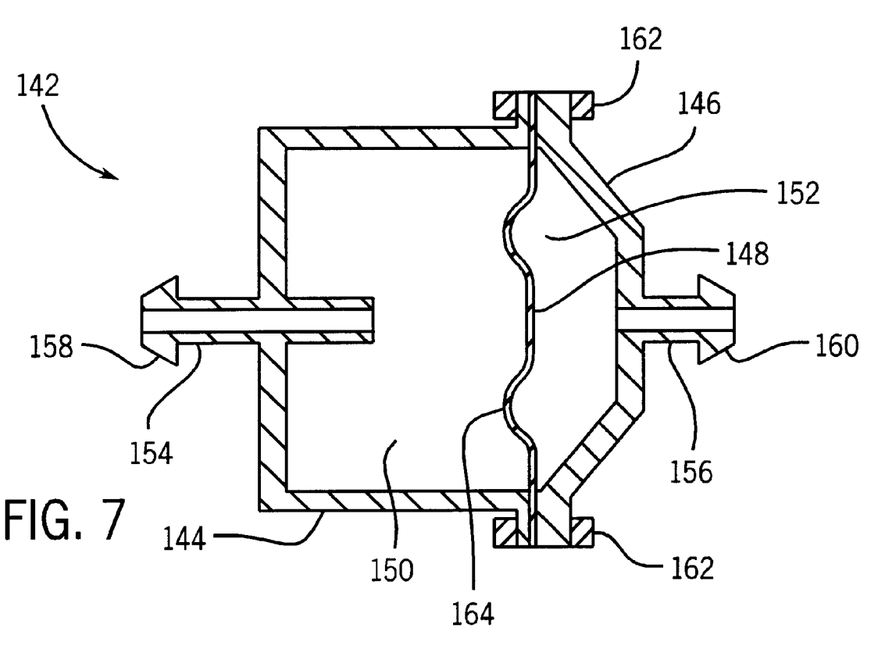
FIG. 7 is an alternative embodiment of the exhaust pressure sensing system.

Alternatively, the sensor assembly 76 may have combined and/or modified components. FIG. 7 is a cross-sectional view of an alternative embodiment of the sensor assembly 76, wherein the attenuation chamber 92 and diaphragm assembly 94 are combined/replaced by a pressure attenuation assembly 142. In this exemplary embodiment, the pressure attenuation assembly 142 has sections 144 and 146 disposed about a diaphragm structure 148 to form opposite cavities 150 and 152, respectively. The sections 144 and 146 also have coupling members 154 and 156 with flanged ends 158 and 160 for pressure fitting within the conduits 110 and 116, respectively. Accordingly, exhaust gases may enter through the coupling member 154, enter the cavity 150, and pressuringly interact with the diaphragm structure 148. The diaphragm structure 148 then advantageously attenuates pressure fluctuations from the exhaust gases, and typically isolates the exhaust gases from the pressure sensor 96. The cavity 150 also may be configured for attenuating or softening pressure fluctuations or pulses. For example, the cavity 150 may be relatively larger than the cavity 146 (e.g., similar to the attenuation chamber 92), and may have the coupling member 154 extending partially into the cavity 150. The larger volume of the cavity 150 allows the exhaust gases space to attenuate pressure fluctuations, while additional elements may be added to further attenuate the pressure fluctuations.

The pressure attenuation assembly 142 can have a variety of elements, modifications, and geometric configurations to accommodate a particular application and/or properties of the exhaust gases (e.g., temperature, pressure, etc.). In one example, the pressure attenuation assembly 142 comprises a variety of metallic or other suitable materials, and has internal elements for breaking up and/or directing incoming exhaust gases so as to attenuate pressure fluctuations. The pressure attenuation assembly 142 itself may be multi-sectional, as illustrated, or a single component. For example, the sections 144 and 146 can be fixedly attached (e.g., welded), or removably coupled by securement members 162 (e.g., nut and bolt). The diaphragm structure 148 also may comprise multiple sections and/or diaphragms, and may have one or more structural features such as rib 164. For example, the pressure attenuation assembly 142 can be formed with a plurality of chambers separated by diaphragms. The sensor assembly 76 also may have one or more filters (e.g., to filter out liquid or particulate), valves, gauges, insulation layers, circuits, or other electrical or mechanical devices. For example, sensor assembly 76 can include an attenuation circuit to attenuate (e.g., by time averaging) any residual pressure fluctuations apparent in the reading provided by the sensor 96.

The pressure reading from the pressure sensor 96 may be utilized by the control assembly 84, or for servicing the engine 12. The control assembly 84 utilizes the pressure reading to quickly respond to performance variations in the engine 12 and to provide corrections (e.g., corrected control signals) for improved performance. The pressure readings may essentially be a real-time average pressure of the exhaust gases that moves over time as operational characteristics of the engine change. As noted above, the control signals may relate to ignition and fuel injection timing, or other controllable parameters. In one example, control assembly 84 uses the pressure readings to ensure that the air-fuel mixture is at a desired fuel-air mixture, such as a stoichiometric mixture. The exemplary control assembly 84 comprises a processor, circuits, memory, and various control parameters stored on the memory. Various other sensors and gauges (e.g., oxygen sensors, temperature sensors, etc.) also may be coupled to the control assembly 84.

Accordingly, the present technique relates to combustion control and engine performance, and more particularly to determining combustion conditions and control parameters for the control assembly 84. For example, the control assembly 84 may be coupled to a number of sensors for sensing properties of the combustion chamber and/or for sensing downstream properties (e.g., exhaust pressure). The properties measured by the sensors are then be used by the control assembly 84 to adjust various controllable engine parameters (e.g., fuel injection and ignition) to ensure desired operational characteristics of the engine (i.e., fuel-air mixture, emission reduction, etc.).

Control assembly 84 stores previously mapped values for fuel injection (e.g., fuel amount and timing), for ignition (e.g., spark timing), and for other controllable parameters for various operational characteristics of the engine (e.g., percent throttle, speed or engine rpm, temperature, pressure, etc.). The previously mapped values are then used by the control assembly 84 as reference or default values for controlling the engine, subject to adjustment according to the sensed properties. For example, as the pressure sensor 96 measures the exhaust pressure, the control assembly 84 determines whether the engine is operating at the desired operational characteristics, makes adjustments from the mapped values to achieve the desired operational characteristics, compares the actual values with the mapped values, and then determines a correction factor for the previously mapped values to improve performance of the engine.

The present technique is particularly amenable for use in fuel-injected, two-stroke engines, such as the direct injection engine described above. By way of example, at a particular operating condition, the fuel injection rate actually applied to the single cylinder is compared to a previously stored fuel map value for a desired mixture (e.g., stoichiometric). If the fuel injection rate deviates from the previously mapped value, then a correction factor is determined to account for the deviation (e.g., a ratio between the actual and mapped fuel injection rates or amounts). The control assembly 84 then utilizes the correction factor to adjust the mapped value to provide the fuel injection rate corresponding to the desired mixture for the particular operating conditions. As the control assembly 84 continuously evaluates the sensed properties, and adjusts the engine, the sensor assembly 76 of the present technique is particularly advantageous in ensuring rapid adjustment of the controllable properties.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A system for sensing exhaust pressure of an internal combustion engine, comprising:
    an exhaust port coupled into fluid communication with an exhaust flow path of the internal combustion engine;
    a diaphragm disposed over the exhaust port;
    a pressure sensor disposed adjacent the diaphragm; and
    an attenuation chamber disposed on an opposite side of the diaphragm relative to the pressure sensor.

2. The system as recited in claim 1, wherein the diaphragm is combined with the attenuation chamber.

3. The system as recited in claim 1, wherein the attenuation chamber has a cross-sectional area greater than the cross-sectional area of the exhaust port.

4. The system as recited in claim 3, further comprising an exhaust system to which the exhaust port is coupled.

5. The system as recited in claim 4, wherein the exhaust system is connected to a two-stroke engine exhaust outlet port.

6. A system for promoting a more optimal air-fuel mixture in an engine, comprising:
    a two-stroke engine including a cylinder having an exhaust outlet and an exhaust system in fluid communication with the exhaust outlets, wherein the exhaust system has a pressure sampling port;
    a pressure sensor disposed to sense an exhaust pressure signal via the pressure sampling port; and
    an attenuator to attenuate noise in the exhaust pressure signal.

7. The system as recited in claim 6, further comprising a diaphragm disposed intermediate the pressure sensor and the pressure sampling port.

8. The system as recited in claim 7, wherein the attenuator comprises a chamber disposed between the pressure sampling port and the pressure sensor.

9. The system as recited in claim 8, wherein the chamber has a cross-sectional area greater than the crosssectional area of the pressure sampling port.

10. The system as recited in claim 7, wherein the attenuator comprises an electronic attenuation circuit.

11. A system for promoting a more optimal air-fuel mixture in a watercraft, comprising:
    an engine including a cylinder having an exhaust outlet and an exhaust system in fluid communication with the exhaust outlets, wherein the exhaust system has a pressure sampling port;
    a pressure sensor disposed to sense an exhaust pressure signal via the pressure sampling port; and
    an attenuator to attenuate noise in the exhaust pressure signal.

12. The system as recited in claim 11, further comprising a diaphragm disposed intermediate the pressure sensor and the pressure sampling port.

13. The system as recited in claim 12, wherein the attenuator comprises a chamber disposed between the pressure sampling port and the pressure sensor.

14. The system as recited in claim 13, wherein the chamber has a cross-sectional area greater than the cross-sectional area of the pressure sampling port.

15. The system as recited in claim 12, wherein the attenuator comprises an electronic attenuation circuit.

16. The system as recited in claim 11, wherein the engine is a two-stroke engine.

17. The system as recited in claim 16, wherein the two-stroke engine is an outboard motor.

18. The system as recited in claim 17, wherein the watercraft comprises a boat.

19. The system as recited in claim 16, wherein the engine is a fuel injected engine.

20. A system for promoting a more optimal air-fuel mixture in a fuel injected engine, comprising:
    a direct fuel injected engine including a cylinder having an exhaust outlet and an exhaust system in fluid communication with the exhaust outlets, wherein the exhaust system has a pressure sampling port;
    a pressure sensor disposed to sense an exhaust pressure signal via the pressure sampling port; and
    an attenuator to attenuate noise in the exhaust pressure signal.

21. The system as recited in claim 20, wherein the direct fuel injected engine comprises a two-stroke engine.

22. The system as recited in claim 21, wherein the two-stroke engine includes a spark plug to create an ignition spark across a pair of electrodes further wherein fuel is directly injected at the pair of electrodes.

23. The system as recited in claim 22, further comprising a diaphragm disposed intermediate the pressure sensor and the pressure sampling port.

24. The system as recited in claim 23, wherein the attenuator comprises a chamber disposed between the pressure sampling port and the pressure sensor.

25. The system as recited in claim 24, wherein the chamber has a cross-sectional area greater than the cross-sectional area of the pressure sampling port.

26. The system as recited in claim 23, wherein the attenuator comprises an electronic attenuation circuit.

27. A method for promoting a more optimal air-fuel mixture in an engine, comprising:
    releasing a sample of exhaust from an engine cylinder during engine operation;
    attenuating exhaust signal noise from the sample;
    sensing the pressure over a period of time; and
    adjusting the fuel delivered to the engine cylinder according to the sensed pressure.

28. The method as recited in claim 27, wherein releasing comprises releasing the sample from a two-stroke engine cylinder.

29. The method as recited in claim 27, wherein attenuating comprises an attenuation chamber to dampen the exhaust signal noise.

30. The method as recited in claim 28, wherein attenuating comprises an attenuation chamber to dampen the exhaust signal noise.

31. The method as recited in claim 27, wherein sensing includes deploying a diaphragm between a pressure sensor and the sample of exhaust.

32. The method as recited in claim 28, further comprising directly injecting fuel into the cylinder.

33. The method as recited in claim 32, wherein directly injecting comprises injecting the fuel directly at an ignition spark.

34. A system for promoting a more optimal air-fuel mixture in an engine, comprising:

means for releasing a sample of exhaust from an engine cylinder during engine operation;

means for attenuating exhaust signal noise from the sample;

means for sensing the pressure over a period of time; and means for adjusting the fuel delivered to the engine cylinder according to the sensed pressure.

35. The system as recited in claim 34, wherein the means for releasing comprises an exhaust sample port.

36. The system as recited in claim 34, wherein the means for attenuating comprises an attenuation chamber.

37. The system as recited in claim 34, wherein the means for sensing comprises a pressure sensor.

38. The system as recited in claim 37, wherein the means for sensing comprises a diaphragm disposed to cooperate with the pressure sensor.

39. The system as recited in claim 34, wherein the means for adjusting comprises a fuel injector disposed to inject fuel directly into the engine cylinder.

40. The system as recited in claim 39, wherein the engine cylinder is disposed in a two-stroke engine.

41. The system as recited in claim 40, wherein the fuel injector is oriented to inject fuel directly at an ignition spark.

\* \* \* \* \*